Figure 1:
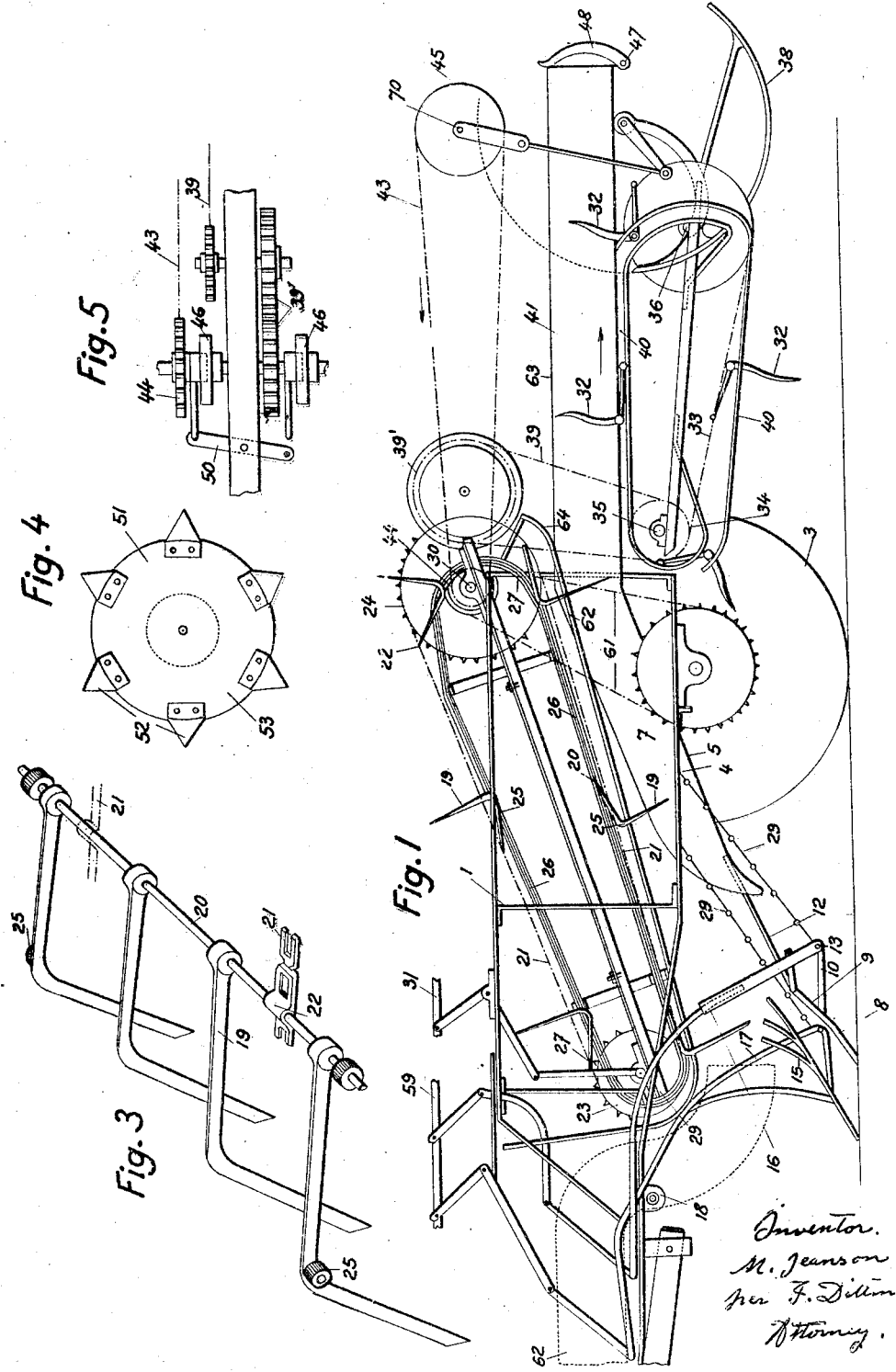

Sept. 25, 1928.  
M. JEANSON  
COMBINED RAKE AND BINDING APPARATUS  
Filed July 31, 1925  
1,685,163  
3 Sheets-Sheet 1

Sept. 25, 1928.  1,685,163
M. JEANSON
COMBINED RAKE AND BINDING APPARATUS
Filed July 31, 1925   3 Sheets-Sheet 2

Patented Sept. 25, 1928.

1,685,163

UNITED STATES PATENT OFFICE.

MARI JEANSON, OF ETRELLES, FRANCE.

COMBINED RAKE AND BINDING APPARATUS.

Application filed July 31, 1925, Serial No. 47,358, and in France July 31, 1924.

The question of the proper baling of fodder, and principally of hay, is becoming more difficult by reason of the lack of skilled labour and of the fatigue occasioned by the hand baling operation.

Known types of hand baling machines are in use, but although skilled labour is not required for their operation, there is no diminution in the number of persons employed. As concerns baling press, while their use may be justified for purposes of transportation, they are not to be recommended for farm or other local use by reason of their great cost and also of the imperfect state of the fodder which is thus prepared when it comes to be employed.

The problem to be solved thus consists in the suitable construction of a machine which will take up the hay which is left upon the ground after the use of the mowing or the hay making machine and will form it into bales, without requiring any intermediate or separate handling.

With the successive operations of such a machine, it will not be necessary to stack up the hay, or in other words the hay can be taken up after the stacks or piles have been taken apart and the hay is spread upon the ground in preparation for the baling process.

In my invention, I obtain all the aforesaid features by the combination of a certain number of devices which may however be employed separately or in a suitable number in machines of the same type and for like purposes.

The devices which I employ are as follows:

1. A general machine frame which is mounted upon two driving wheels adapted for travel upon the ground;

2. A rake properly so called which is open at the rear and serves to take up the hay from the ground;

3. A lifting device or elevator with continuous operation, which removes the hay from the rake and discharges it at an upper level;

4. An entraining and pressing device for the hay, with intermittent drive, upon which the hay delivered by the elevator accumulates during the periods of stoppage, this hay being then drawn forward, as well as the hay which is brought during the operation period, the same being piled upon a suitable rack;

5. A binder consisting of one or more needles, together with suitable tying means, as in the known binder; the motion of the said binder is alternated with the motion of the said entraining device, and these two movements continue without interruption;

6. A device controlling the succession movements of the entraining device and the binder;

7. An apparatus from drawing in the rows of hay, which is disposed at the side of the machine and adapted to separate the hay into rows or lines, either immediately before it is taken up, or when the preceding row is taken up, or both of these methods may be employed concurrently.

The appended drawings show by way of example an embodiment of my said invention.

Figure 2:
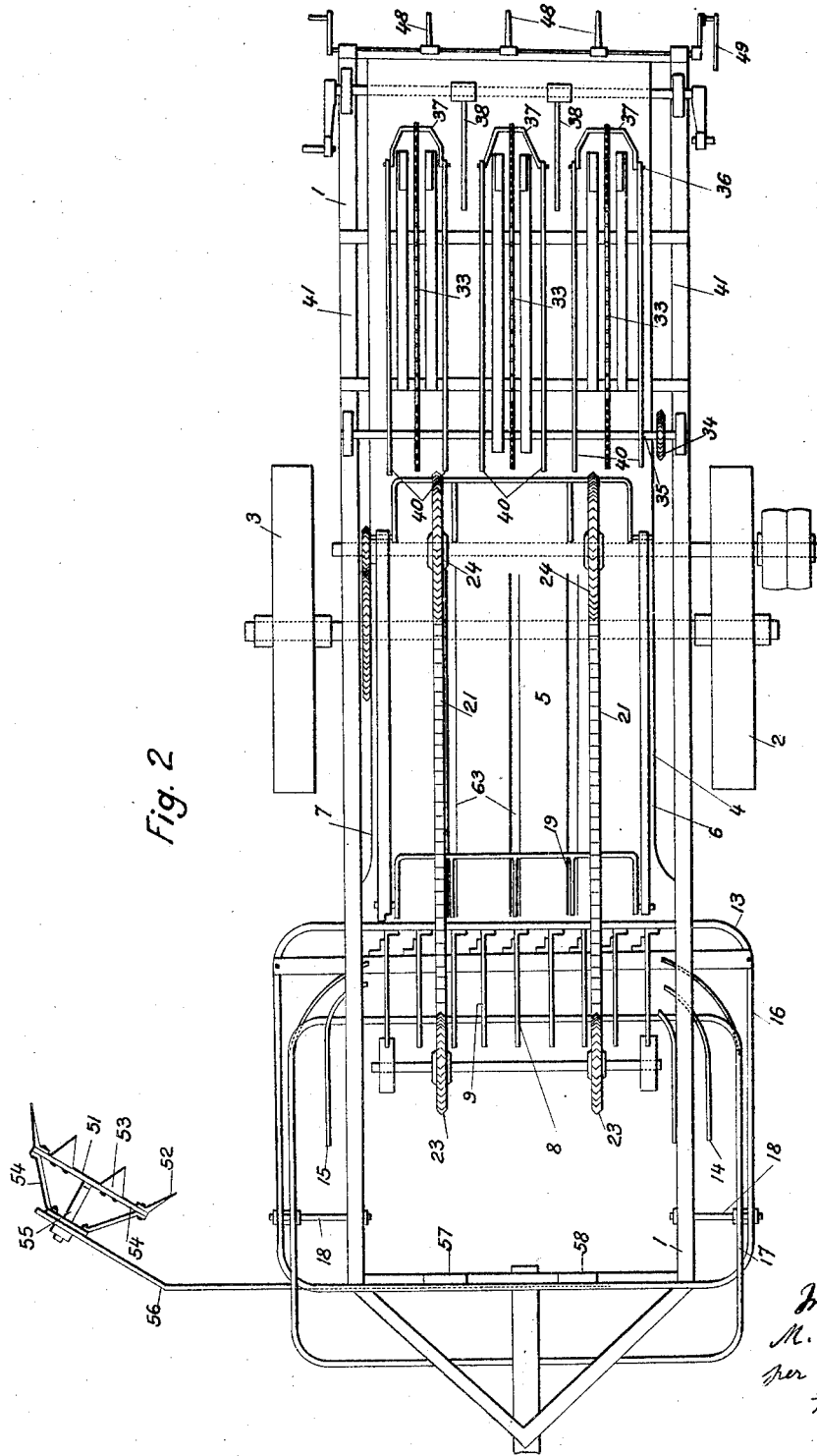
Figure 6:
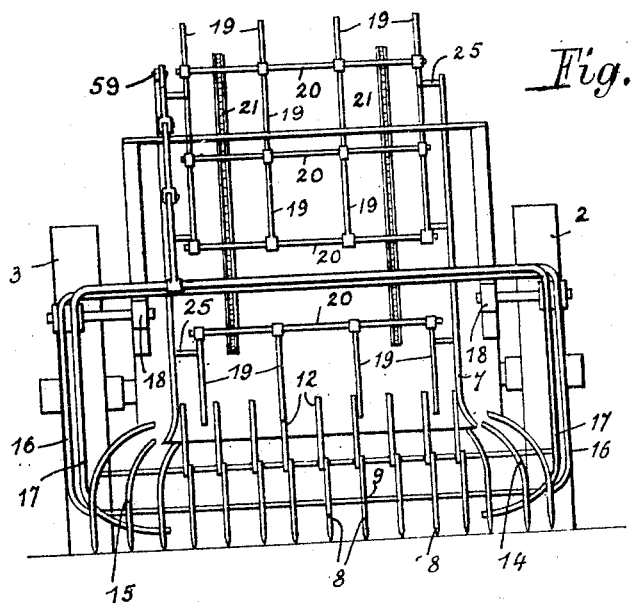
Figure 7:
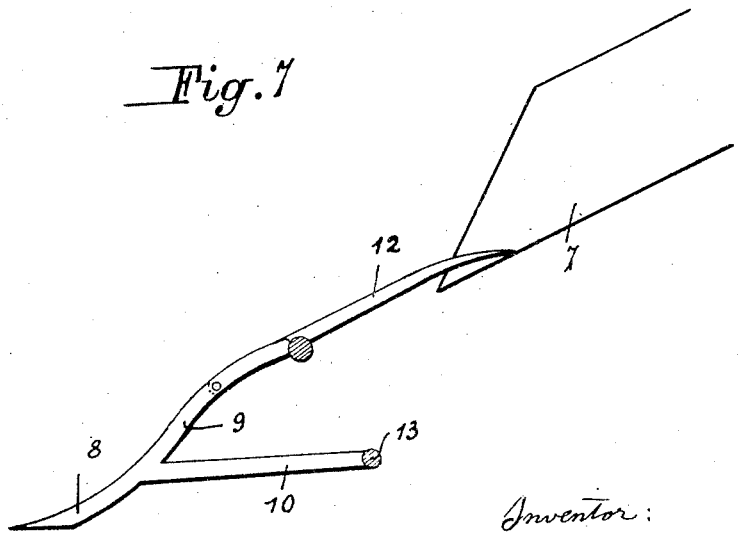

Fig. 1 is a side elevation of the machine and Fig. 2 a plan view. Fig. 3 is a perspective view of an elevating claw, with its attaching and controlling devices. Fig. 4 is a plan view of the apparatus for drawing in the rows of hay. Fig. 5 is a detail of the alternate control of the entraining device and the binder. Figure 6 is a front elevation. Figure 7 is an enlarged detail of one of the teeth.

In principle, a main frame 1 of suitable shape and construction is mounted on two carrying wheels 2 and 3 adapted to travel on the ground. Upon the said frame is mounted a trough 4 consisting of a bottom part 5 and two vertical sides 6 and 7; the hay which is to be baled is circulated through the said trough.

The rake properly so called is mounted at the front part and consists of three sections. The middle section 8 comprises teeth whereof each consists of various members pivoted together; the front member 9 is consolidated by a support 10 and rests upon the ground in order to take up and elevate the hay, whilst the rear member 12 conducts it into the trough 4. This characteristic disposition serves to maintain the hay at the proper distance and to avoid as far as possible all contact with the cross bars 13 of the rake, which would produce clogging.

The two lateral sections 14 and 15 of the rake consist of teeth of different lengths which are spread outwardly and whose combination forms a collecting device for throwing the hay at the border upon the middle section. The three sections, 8, 14 and 15 are connected with the main frame by the rods 16 and 17 whose attaching point 18 is situated farther forward than the points of the rake teeth, so that the device will clear all obstacles and will not bend up. The chains are attached to the main frame and serve to maintain the rake teeth when the device is lifted, while affording the necessary elasticity for following the undulations of the ground.

The hay elevating device consists of a plurality of claws or rake teeth 19, connected together by the common front cross pieces 20 which are pivotally mounted on the sprocket chains 21 by the suitable links 22; said chains are actuated by the sprocket wheels 23 and 24, the wheel 24 being a driving wheel. Each of the claws 19 is provided on either side with rollers 25 adapted to roll in the lateral guides 26; the latter are so disposed as to form a cam 27 which serves for the removal of the hay from the teeth 19 by a movement perpendicular to the direction of motion of the teeth, in order to prevent the hay from being taken up during the back motion of the said teeth. The teeth 19 extend through the flooring 62, passing through the slots 63 provided for the purpose and the guides 64 extending to the rear as far as the binding device and thus maintaining the hay above the said trough.

The device constituting the hay elevator is mounted on a secondary frame 28 pivoting on the driving shaft 30 by means of the control lever 31, so as to change the section of travel of the hay between the elevator, the rakes and the trough. The side members 6 and 7 of the trough 4 may be movable rearwardly to adjust the width of the bale 29 are flexible means connecting the teeth with the frame 28.

The device for entraining and pressing the hay disposed at the upper part of the elevator and below the hay and succeeding the said elevator, is of like construction; however its motion is not continuous but intermittent. It consists of the teeth or claws 32, in variable number, forming a rake; said teeth are disposed on the chains 33 actuated by gear wheels 34 whose ratios are such that each rake of the first entraining device, is at a suitable distance from said teeth, thus facilitating the separation of the hay.

The gear wheels 34 are keyed to the shaft 35 and are thus connected together, whilst the rear shaft 36 and the rakes themselves are divided into various sections 37 (Fig. 2), whereby the teeth 38 of the binder will be enabled to properly surround the bale without being obliged to traverse the hay, by passing to the rear of the rake teeth 32 and across the shafts 36.

The shaft 5 is actuated by the shaft of the wheel 24 of the elevator by means of the chain 39 and the reversing wheels 39′. Each section of the rakes is guided by the guideways 40 serving as cams at the exit of the teeth, so that the latter will move outwardly in a direction perpendicular to that of the guideway without entraining it. They may be made in several parts to facilitate the construction, and the side members 41 of the said trough will serve as a channel for the hay.

The pointed members or needles 38 are actuated by the chain 43, which is driven by the wheel 44 keyed to the shaft 24 and actuating the wheel 45, or by other suitable means. The device comprises two roller clutches 46 which are adapted to drive either the needles 38 to form the bale, or the rakes 32; the latter are stopped during the operation of the said needles, and the hay delivered by the elevator will accumulate between the rakes of the entraining device when the latter is stopped, this being only for a short time in all cases. The intermittently operating clutches 46 are controlled by the pressing lever 47 having various arms 48, the rod 49 and the pivoting lever 50. An adjustable spring determines the pressure of the lever 47 and the degree of compression of the bale.

By this arrangement of the entraining and compressing device, I am enabled to keep the elevator clear at all times, to further the separation of the hay and to press it together immediately above the said needles, distributing the work of compression upon a longer period than usual, the bale is tied during the inoperative period of the said entraining device, thus obviating all shocks during the work. To enable the free motion of the needle around the bale of hay, I dispose upon the shaft 65 the compressing and separating devices, comprising an arm 67 for compressing the hay during the travel of the needle, and a flat portion 68 which separates the bale of hay from the succeeding bale, concurrently with the back of the needles; said parts are controlled by a cam 69 mounted on the shaft 70 of the binding device, or in any other suitable manner.

The arrangement for drawing in the rows or lines of hay consists of a disk 51 provided at the lower part with the teeth 52 which have a suitable shape and are preferably triangular, these being disposed in a circular row 53, said device being connected by the arms 54 to a shaft 55; the rod 56 serves to connect the apparatus with the machine frame. Said rod is slidable in two guides 57 and 58 for its suitable adjustment according to the width of the rows of hay to be collected. The device is set when in the operative position by suitable means. The shaft 55 is inclined from the ground, so that only a few of the teeth 52 will enter into contact with the ground, and this will cause the disk to rotate when the machine moves forward. The disk 51 and the teeth 52 have suitable dimensions and number.

The hay is raised from the ground by the few teeth 52 in contact therewith, and due to the rotation of the disk 51 the hay is brought to the other side of the disk and is thence discharged by reason of the inclined position of the shaft 55, it being taken up by the teeth of the rake either at once or during the second passage, forming in the latter case a clear line of separation from the remainder of the hay and adapted for the travel of the horses during the next passage.

Should two such collecting apparatus be employed, the first will be placed in front of the rake and will serve only for the first passage of the latter in a given field; the second and the following rows being formed by the second apparatus, which will be sufficient for the entire work as soon as the first trip has been made. If the hay is not to be separated into lines in advance, the front apparatus, nearest the rake, will be alone employed.

The pressure of the disk on the ground may be regulated by means of a spring, not shown, acting on the rod 56, and should it be desired to avoid contact between the disk and the ground to obviate the collection of moss, or for like reasons, the disk may be raised by a chain. The disk might be rotated directly from the rake itself, by gearing, chain or belt, or the like.

The machine is completed by lever 59 for raising the teeth of the rake, as well as a lever 60 for raising the elevator by means of the chain drive 61 of the latter, also by the wheel 3 and by a lever 71 controlling the said collecting disk. A seat may be provided at the rear to facilitate the driving of the machine and the operating of the levers.

Should it be desired to employ the machine solely for the baling of hay in the fixed position, a gear table 62 is disposed at the front of the main frame and serves to deliver the hay to the elevator, the whole device being driven either by a horse whim, or by a suitable motor with fixed and loose pulleys mounted on the shaft 30; the rake is now inoperative and may be eliminated.

Obviously, my said machine is susceptible of other arrangements in detail without departing from the principle of the invention, which is independent of the shapes, outlines, sizes and material of the several elements of construction, the apparatus hereinbefore described being only one embodiment of the said invention, and for example the said baling apparatus alone may be fitted to threshing machines in order to bind the straw discharged therefrom, or the like.

I claim:

1. A combined rake and binding apparatus comprising a main frame carrying wheels, central teeth composed of various members pivoted together, a pivot shaft for the teeth which forms part of a frame pivoting on the machine frame, the axis of pivotation being situated forwardly of the points of the said teeth, lateral teeth of different lengths forming a collecting element situated within the machine frame, a pivot shaft for the said teeth forming part of a frame pivoting on the machine frame and situated forwardly of the said teeth, chains connecting each group of teeth with the machine frame, and means for raising the said pivoting frames.

2. A combined rake and binding apparatus comprising one or more rotatable disks, teeth disposed thereon, rods on which the disks are rotatably mounted, guideways in which the said rods are slidable, means for setting the said rods in the guideways, and means for lifting the said disks.

Signed at Paris, in the county of Seine, France, this 24th day of June, A. D. 1925.

MARI JEANSON.